(12) United States Patent
Maeda et al.

(10) Patent No.: US 11,329,580 B2
(45) Date of Patent: May 10, 2022

(54) MOTOR CONTROL APPARATUS AND IMAGE FORMING APPARATUS

(71) Applicant: CANON KABUSHIKI KAISHA, Tokyo (JP)

(72) Inventors: Yasukazu Maeda, Yokohama (JP); Eijiro Ohashi, Tokyo (JP); Takuya Miyashita, Kawasaki (JP)

(73) Assignee: Canon Kabushiki Kalsha, Tokyo (JP)

( * ) Notice: Subject to any disclaimer, the term of this patent is extended or adjusted under 35 U.S.C. 154(b) by 0 days.

(21) Appl. No.: 16/748,118

(22) Filed: Jan. 21, 2020

(65) Prior Publication Data
US 2020/0235684 A1   Jul. 23, 2020

(30) Foreign Application Priority Data

Jan. 22, 2019  (JP) .............................. JP2019-008599

(51) Int. Cl.
*H02P 6/00*    (2016.01)
*H02P 6/14*    (2016.01)
*H02P 6/185*   (2016.01)
*G03G 15/00*   (2006.01)

(52) U.S. Cl.
CPC ......... *H02P 6/185* (2013.01); *G03G 15/5008* (2013.01)

(58) Field of Classification Search
CPC ....................................................... H02P 6/185
USPC .................................................... 318/400.01
See application file for complete search history.

(56) References Cited

U.S. PATENT DOCUMENTS

| 7,847,498 B2 | 12/2010 | Shibuya | |
| 2007/0075671 A1* | 4/2007 | Ahn | H02P 6/20 318/701 |
| 2015/0145454 A1* | 5/2015 | Kameyama | G03G 15/5008 318/400.32 |
| 2019/0319562 A1* | 10/2019 | Narumi | H02P 6/20 |
| 2021/0373484 A1* | 12/2021 | Ohashi | H02M 7/5395 |

FOREIGN PATENT DOCUMENTS

| JP | 07-274585 A | 10/1995 |
| JP | 2003-079184 A | 3/2003 |
| JP | 2008-092784 A | 4/2008 |

OTHER PUBLICATIONS

Co-pending U.S. Appl. No. 16/743,576, filed Jan. 15, 2020.
Co-pending U.S. Appl. No. 16/733,680, filed Jan. 3, 2020.

* cited by examiner

*Primary Examiner* — Erick D Glass
(74) *Attorney, Agent, or Firm* — Venable LLP

(57) ABSTRACT

A motor control apparatus includes: an excitation unit configured to excite a plurality of excitation phases of a motor; a measurement unit configured to measure a physical amount that changes according to an inductance of a plurality of coils that make up the plurality of excitation phases when the plurality of excitation phases are excited; and a control unit configured to control the excitation unit to excite the plurality of excitation phases sequentially, determine a first excitation phase by comparing a measurement value measured by the measurement unit in excitation of each of the plurality of excitation phases with a first threshold, and determine that a rotational position of a rotor of the motor is a rotational position at which the rotor stops when the first excitation phase is excited. The first excitation phase is determined, the control unit stops excitation.

17 Claims, 9 Drawing Sheets

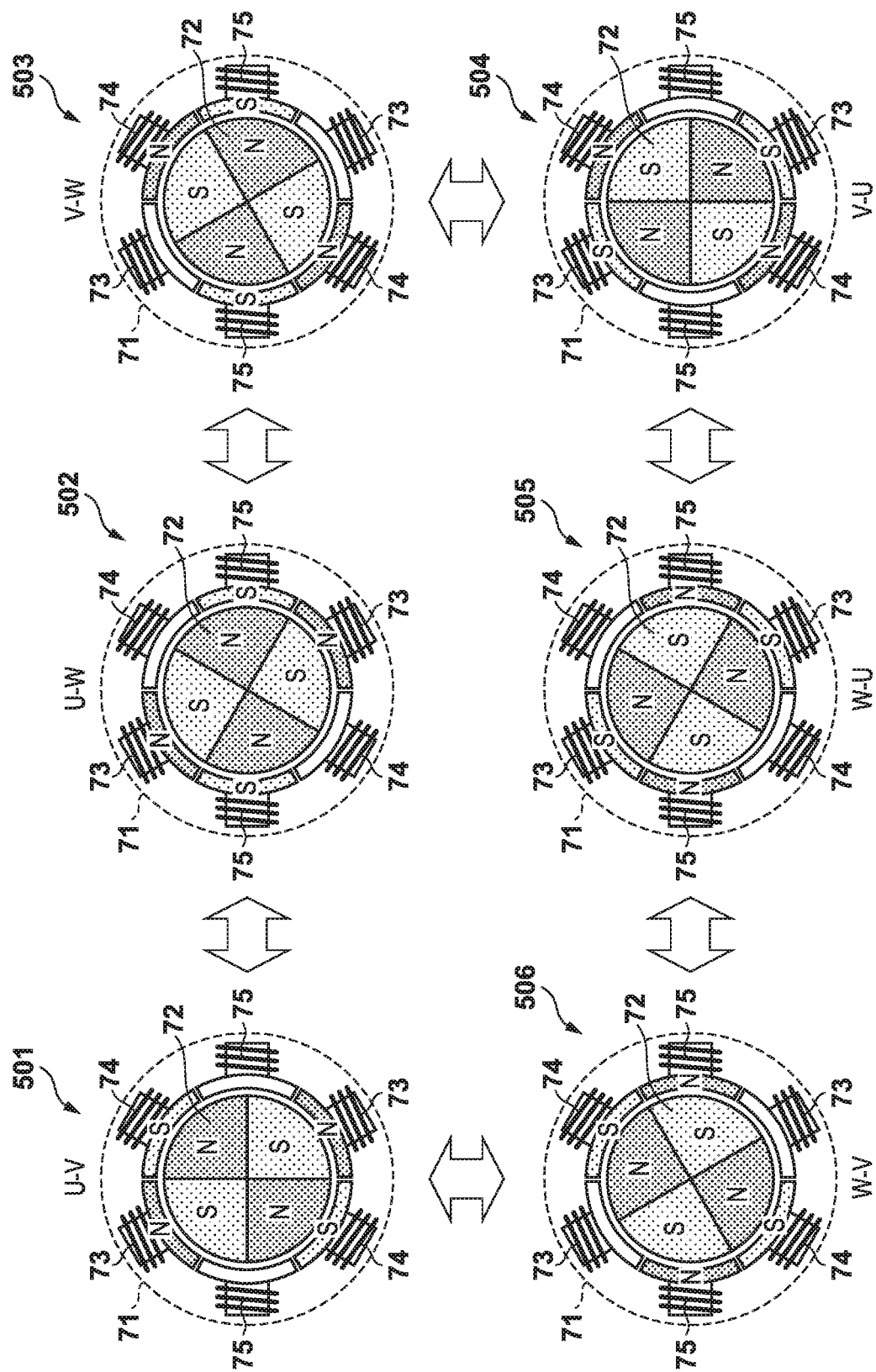

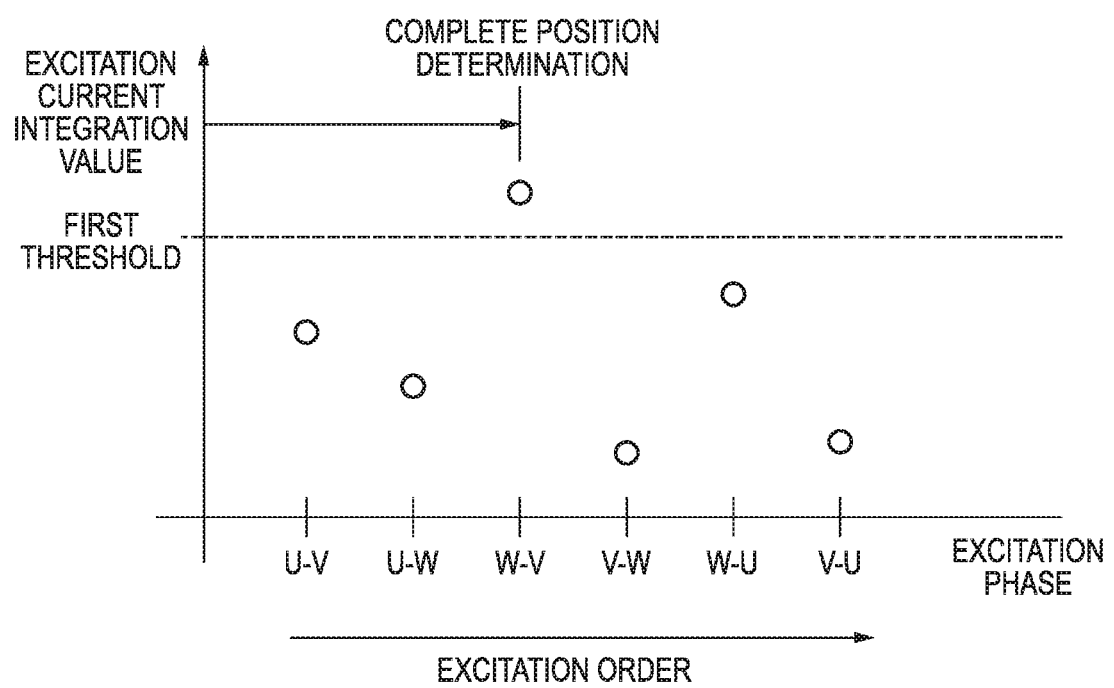

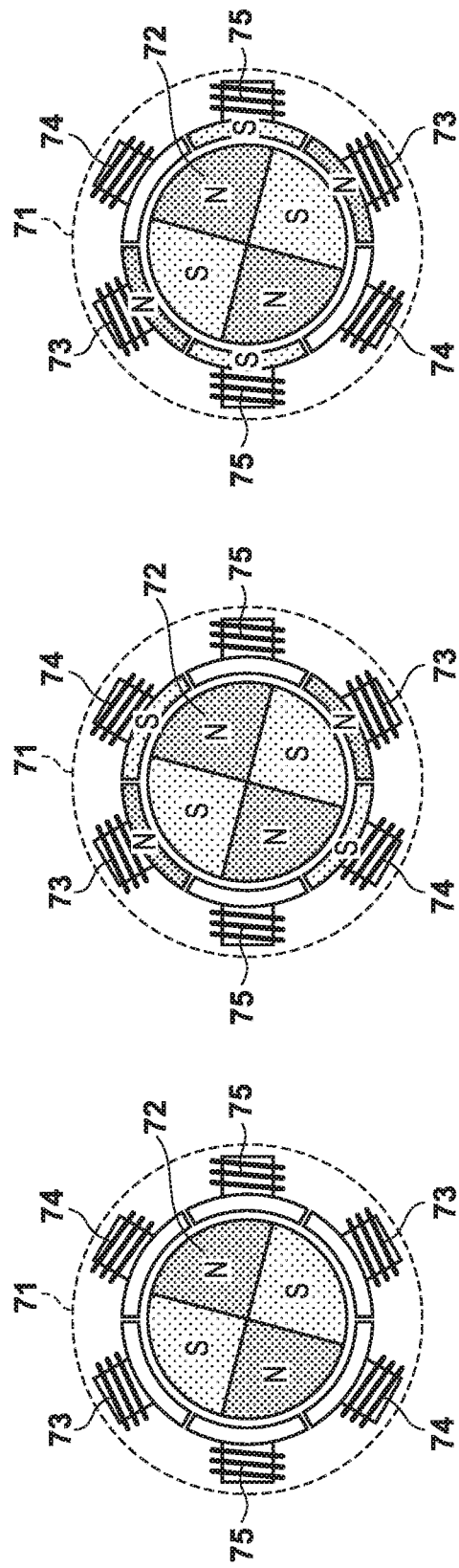

MOTOR CONTROL APPARATUS AND IMAGE FORMING APPARATUS

BACKGROUND OF THE INVENTION

Field of the Invention

The present invention relates to technology for controlling a motor.

Description of the Related Art

DC brushless motors used for a driving source of a rotating member of an image forming apparatus include a sensorless motor that does not have a Hall element for detecting a rotation position as disclosed in Japanese Patent Laid-Open No. 2003-79184. In processing for starting a motor, processing that is based on a stopping position of a rotor (hereinafter, referred to as "rotor stopping position") is performed in order to prevent step-out and inverse rotation when starting the motor. Therefore, in processing for starting a sensorless motor, a rotor stopping position is detected. US-2015-145454 discloses a configuration for detecting a rotor stopping position based on an excitation current when a voltage is applied to a coil for a short time.

Specifically, US-2015-145454 discloses detection of a rotor stopping position by sequentially exciting six excitation phases each constituted by a series of two coils out of coils of three phases (U, V, W). In this manner, in the configuration of US-2015-145454, it is necessary to sequentially excite all of the excitation phases in order to detect a rotor stopping position, and a time required for detecting a rotor stopping position is long.

SUMMARY OF THE INVENTION

According to an aspect of the present invention, a motor control apparatus includes: an excitation unit configured to excite a plurality of excitation phases of a motor; a measurement unit configured to measure a physical amount that changes according to an inductance of at least one of a plurality of coils that make up the plurality of excitation phases, when each of the plurality of excitation phases is excited; and a control unit configured to control the excitation unit so as to excite the plurality of excitation phases sequentially, determine a first excitation phase from among the plurality of excitation phases by comparing a measurement value measured by the measurement unit in excitation of each of the plurality of excitation phases with a first threshold, and determine that a rotational position of a rotor of the motor is a rotational position at which the rotor stops when the first excitation phase is excited, wherein, when the first excitation phase is determined, the control unit stops excitation of the plurality of excitation phases.

Further features of the present invention will become apparent from the following description of exemplary embodiments with reference to the attached drawings.

BRIEF DESCRIPTION OF THE DRAWINGS

FIG. 4 is a diagram illustrating the relationship between an excitation phase and a rotor stopping position according to an embodiment.

FIG. 8 is a diagram illustrating processing for detecting a rotor stopping position according to an embodiment.

FIGS. 9A to 9C are diagrams illustrating processing for detecting a rotor stopping position according to an embodiment.

DESCRIPTION OF THE EMBODIMENTS

Figure 1:
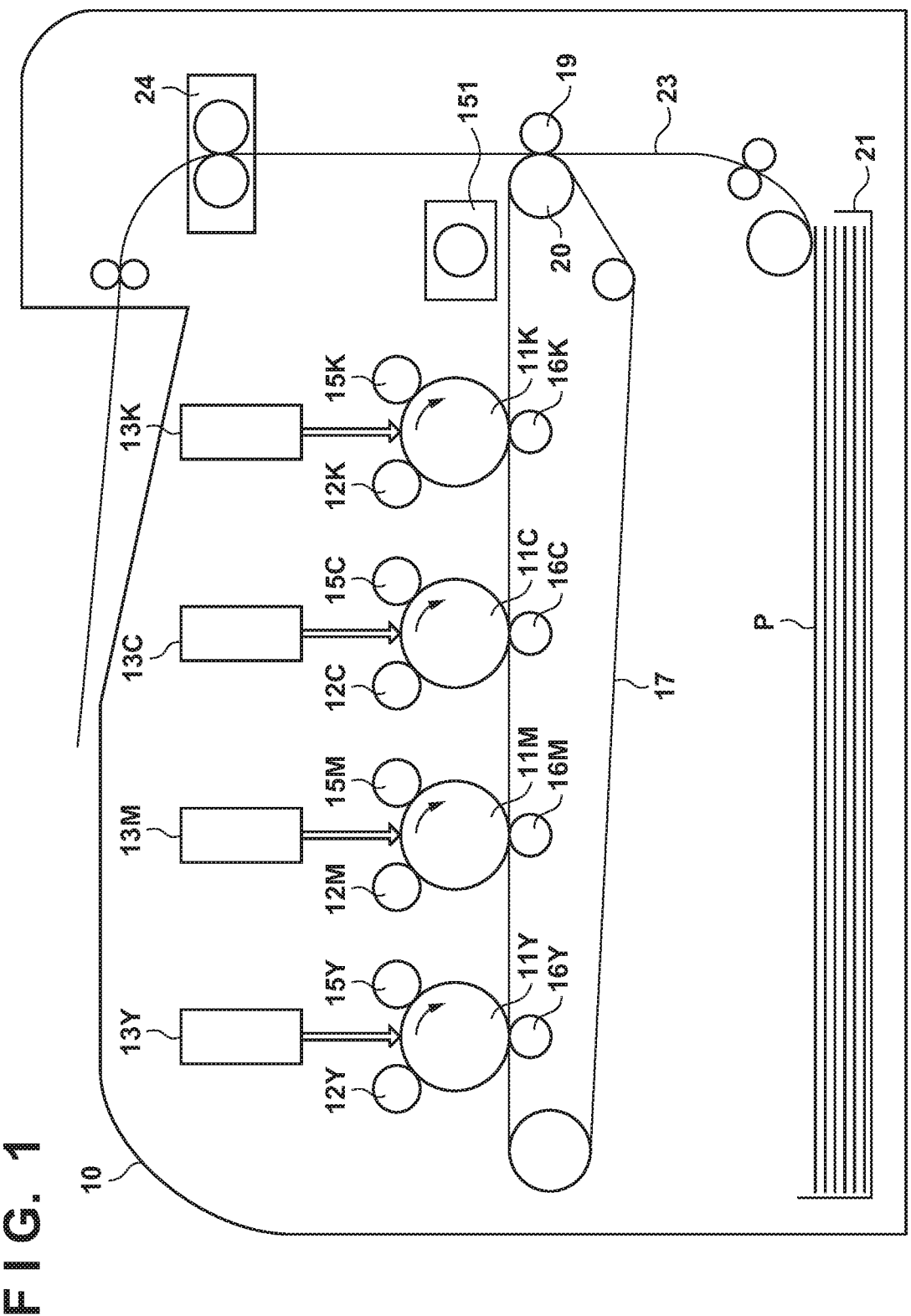
FIG. 1 is a diagram illustrating a configuration of an image forming apparatus according to an embodiment.

Embodiments will be described below in detail with reference to the attached drawings. Note that the following embodiments do not limit the invention according to the scope of the claims. A plurality of features are described in the embodiments, but all of these features are not necessarily essential to the invention, and a plurality of features may be suitably combined. Furthermore, in the attached drawings, the same reference numerals are assigned to the same or similar configurations, and an overlapping description is omitted.

First Embodiment

FIG. 1 shows an image forming apparatus 10 according to this embodiment, which is a printer, a copier, a multi-function peripheral, a facsimile, or the like. The image forming apparatus 10 overlays toner images of four colors, namely yellow (Y), magenta (M), cyan (C), and black (K) to form a full-color image. In FIG. 1, Y, M, C and K at the ends of reference signs indicate that the colors of toner images with which members denoted by the reference signs are involved when the toner images were formed are respectively yellow, magenta, cyan, and black. Note that, in the following description, when it is not necessary to distinguish colors, reference signs without Y, M, C and K at their ends are used. A photosensitive member 11 is driven and rotated in the clockwise direction of the figure when forming an image. A charging unit 12 charges the surface of the photosensitive member 11 to a uniform potential. An exposure unit 13 exposes the surface of the photosensitive member 11 to light so as to form an electrostatic latent image on the photosensitive member 11. A developing roller 15 of a developing unit develops the electrostatic latent image of the photosensitive member 11 using toner by outputting a developing bias, and visualizes it as a toner image. A primary transfer unit 16 transfers the toner image formed on the photosensitive member 11, onto an intermediate transfer belt 17 by applying a primary transfer bias. Note that, as a result of toner images formed on the photosensitive members 11 being overlaid and transferred onto the intermediate transfer belt 17, a full-color image is formed on the intermediate transfer belt 17.

The intermediate transfer belt 17 is driven and rotated in the counter-clockwise direction of the figure by a drive roller 20. Accordingly, the toner image transferred onto the intermediate transfer belt 17 is conveyed to an opposing position of a secondary transfer unit 19. On the other hand, a recording member (sheet) P stored in a cassette 21 is conveyed along a conveyance path 23, and is conveyed to the opposing position of the secondary transfer unit 19. Rollers for conveying the recording member P are provided on the conveyance path 23. The secondary transfer unit 19 transfers the toner image on the intermediate transfer belt 17 onto the recording member P by applying a secondary transfer bias. The recording member P is then conveyed to a fixing device 24. The fixing device 24 applies heat and pressure to the recording member P, and fixes the toner image to the recording member P. After the toner image is fixed, the recording member P is discharged to the outside of the image forming apparatus. A motor 151 causes the photosensitive member 11, the charging unit 12, the developing roller 15, the primary transfer unit 16, and the drive roller 20 to rotate via a gear mechanism (not illustrated).

Figure 2:
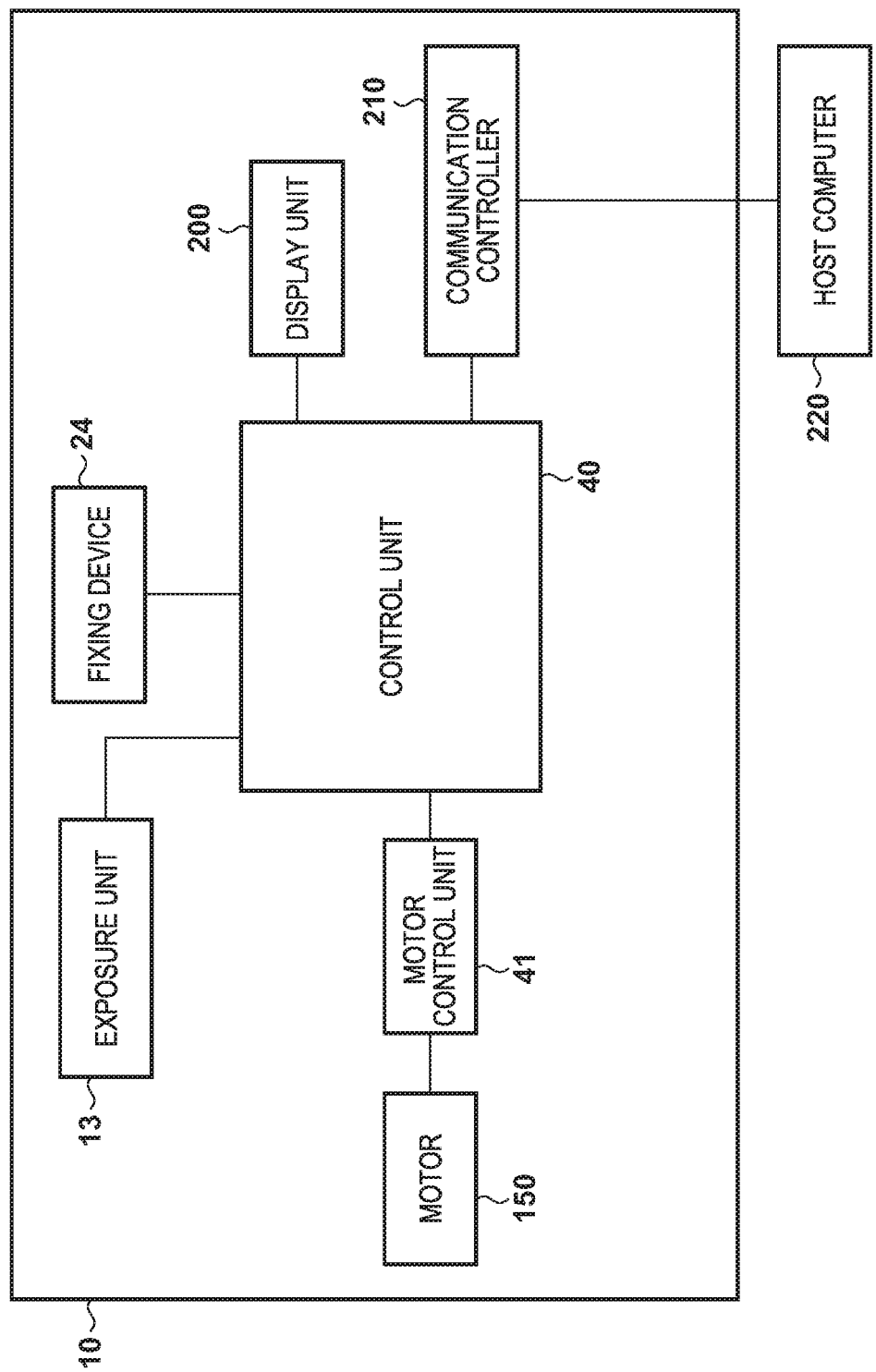
FIG. 2 is a diagram illustrating a control configuration of the image forming apparatus according to an embodiment.

FIG. 2 shows a control configuration of the image forming apparatus. A control unit 40, upon receiving image data of an image to be formed from a host computer 220 via a communication controller 210, starts image formation. When image formation is started, the control unit 40 controls a motor control unit 41 so as to drive and rotate motors 150 that include the motor 151, and perform rotation drive control of rotating members such as the photosensitive member 11, conveyance control of the recording member P, and the like. The control unit 40 also controls the exposure unit 13 so as to form an electrostatic latent image on the photosensitive member 11. Also, the control unit 40 controls the fixing device 24 so as to fix a toner image onto the recording member P. The control unit 40 displays the state of the image forming apparatus in a display unit 200. Note that the control unit 40 includes a microcomputer and a memory. The memory stores various types of control programs and data, and the microcomputer controls the units of the image forming apparatus 10 based on the various types of control programs and data stored in the memory.

Figure 3:
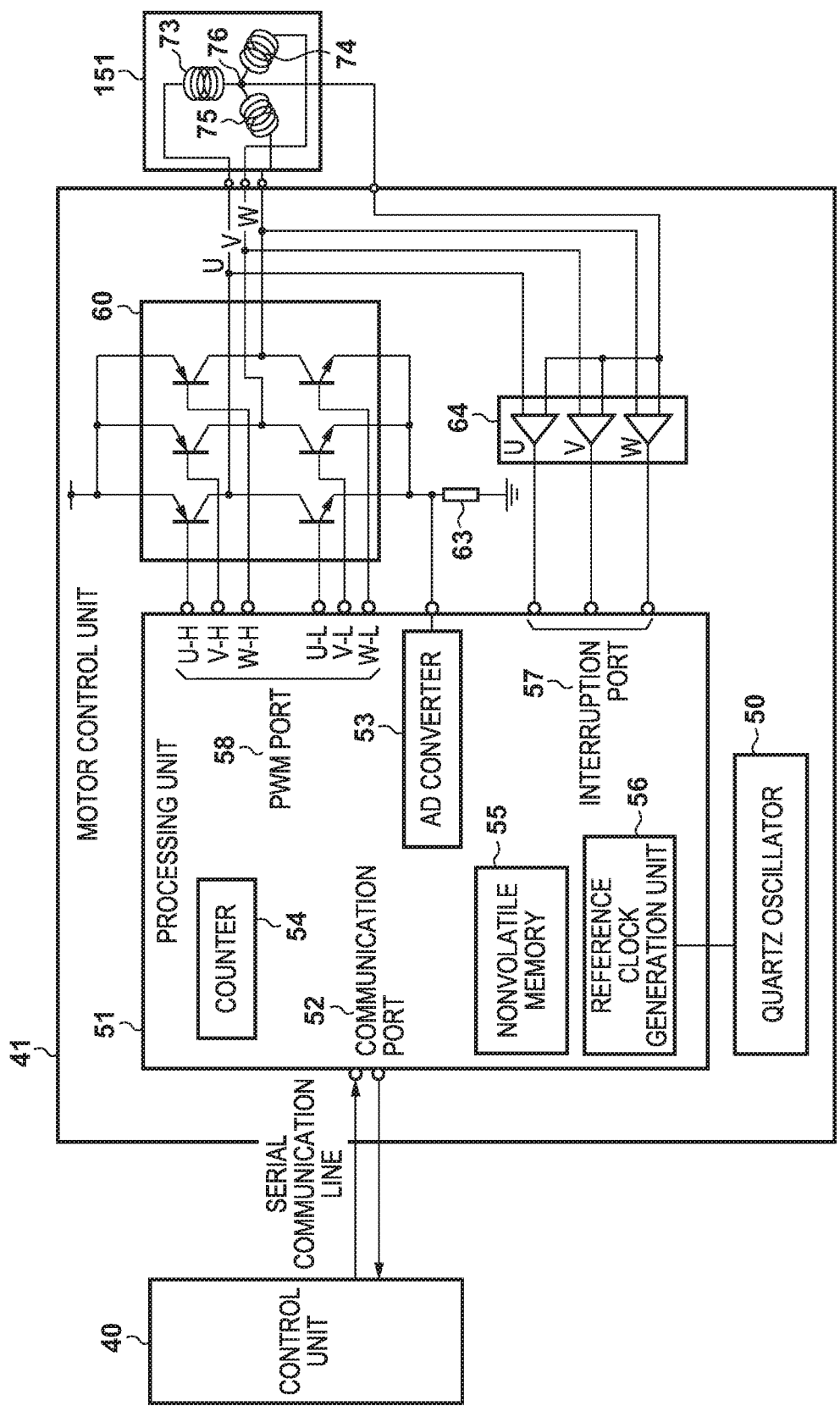
FIG. 3 is a diagram illustrating a configuration of a motor control unit according to an embodiment.

Next, a configuration of the motor control unit 41 that controls the motor 151 will be described with reference to FIG. 3. The motor control unit 41 includes a processing unit 51 realized by a microcomputer and the like. A communication port 52 performs serial data communication with the control unit 40. A counter 54 performs a count operation based on a reference clock generated by a reference clock generation unit 56 using a quartz oscillator 50. A count value of the counter 54 is used for measurement of the cycle of input pulse and time management. A nonvolatile memory 55 is a storage unit that stores data to be used for processing that is performed by the processing unit 51, and the like. A pulse width modulation (PWM) port 58 outputs PWM signals for driving switching elements of a three-phase inverter 60. The switching elements of the three-phase inverter 60 are, for example, FETs, and are driven by the PWM signals to supply a current for excitation to a plurality of coils 73 (U phase), 74 (V phase), and 75 (W phase) of the motor 151. In this manner, the three-phase inverter 60 operates as an excitation unit that excites the motor 151. In addition, the excitation currents in the coils 73, 74, and 75 are converted into a voltage by a resistor 63, and is input to an AD converter 53 of the processing unit 51, as a voltage value indicating the excitation currents. The AD converter 53 converts the input voltage value (analog value) into a digital value. The processing unit 51 determines the values of the excitation currents based on the digital value output by the AD converter 53. In this manner, the resistor 63, the AD converter 53, and the processing unit 51 operate as a measurement unit that measures excitation currents. In addition, a comparator 64 of the motor control unit 41 compares the voltage at a neutral point 76 that is a connection point at which one ends of the coils 73, 74, and 75 are connected, with voltages at the other ends of the respective coils 73, 74, and 75, and outputs the comparison results to an interruption port 57 of the processing unit 51. Specifically, the comparator 64 outputs, to the processing unit 51, signals indicting the directions of inductive voltages in the coils 73, 74, and 75. Note that a filter can be provided in the input portion of the comparator 64 as appropriate. In addition, voltages at the two ends of each of the coils 73, 74, and 75 may be compared in the processing unit 51 without using the comparator 64.

The structure of the motor 151 will be described with reference to FIG. 4. The motor 151 includes a stator 71 having six slots and a rotor 72 having four poles, and the stator 71 includes coils 73, 74, and 75 of three respective phases (U, V, and W). The rotor 72 is constituted by permanent magnets, and includes two sets of N and S poles. The rotational position of the rotor 72 is determined by a combination of the excited coils 73, 74, and 75, in other words excitation phases. Note that, it is assumed that in this embodiment, when an X-Y phase is excited, an excitation current flows from an X-phase coil to a Y-phase coil, and, at this time, the X-phase coil is an N-pole, and the Y-phase coil is an S pole. Therefore, when the U-V phase is excited, the rotor 72 stops at a position indicated by reference numeral 501 in FIG. 4. When a U-W phase is excited, the rotor 72 stops at a position indicated by reference numeral 502 in FIG. 4. Hereinafter, a position at which the rotor 72 stops when the X-Y phase is excited is expressed as the position at the X-Y phase. Reference numerals 501 to 506 in FIG. 4 respectively show states where the U-V phase, the U-W phase, the V-W phase, the V-U phase, the W-U phase, and the W-V phase are excited, and the rotor 72 is stopped at the position at the corresponding excitation phase.

Note that, when rotating the rotor 72, the processing unit 51 sequentially performs excitation according to the rotation direction of the rotor 72, in the clockwise or counterclockwise direction in FIG. 4. For example, in a case of the clockwise direction in FIG. 4, excitation of the U-V phase, the U-W phase, the V-W phase, the V-U phase, the W-U phase, the W-V phase, and the U-V phase in the stated order is repeated. Hereinafter, in this excitation order, two excitation phases adjacent to a certain excitation phase are referred to as adjacent excitation phases of the excitation phase. Similarly, relative to the stopping position of the rotor 72 when a certain excitation phase is excited, the stopping position of the rotor 72 when an excitation phase adjacent to the excitation phase is excited is referred to as an adjacent position. For example, the position at the W-V phase and the position at the U-W phase are positions adjacent to the position at the U-V phase.

In general, a coil has a configuration in which a copper wire is wound around a core that is formed by stacking electrical steel sheets. Also, the magnetic permeability of an electrical steel sheet decreases when an external magnetic field is present, and the inductance of the coil that is proportional to the magnetic permeability also decreases. For example, assume that, as indicated by reference numeral 501 in FIG. 4, the rotor 72 is stopped such that only an S pole of the rotor 72 opposes an opposing position of the U-phase coil 73. In this case, the influence of an external magnetic field of the rotor 72 is large, and thus the degree of reduction in the inductance of the coil 73 is large. Also, the degree of reduction in this inductance also changes according to the direction of a current that flows through the U-phase coil 73. Specifically, if the direction of the magnetic field generated by a current that is caused to flow through the coil 73 is the same as the direction of the external magnetic field from the rotor 72, the degree of reduction in the inductance is larger than in the case where the directions are opposite. Therefore, in the state indicated by reference numeral 501 in FIG. 4, if excitation is performed such that the U-phase coil 73 is an N-pole, the degree of reduction in the inductance is larger than in the case where excitation is performed such that the U-phase coil 73 is an S pole.

Figure 5A:
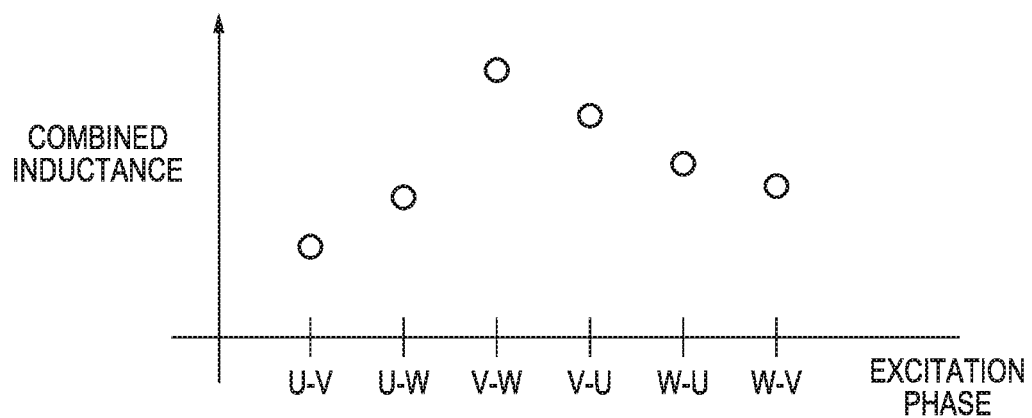
FIG. 5A is a diagram illustrating the relationship between an excitation phase and a combined inductance according to an embodiment.
Figure 5B:
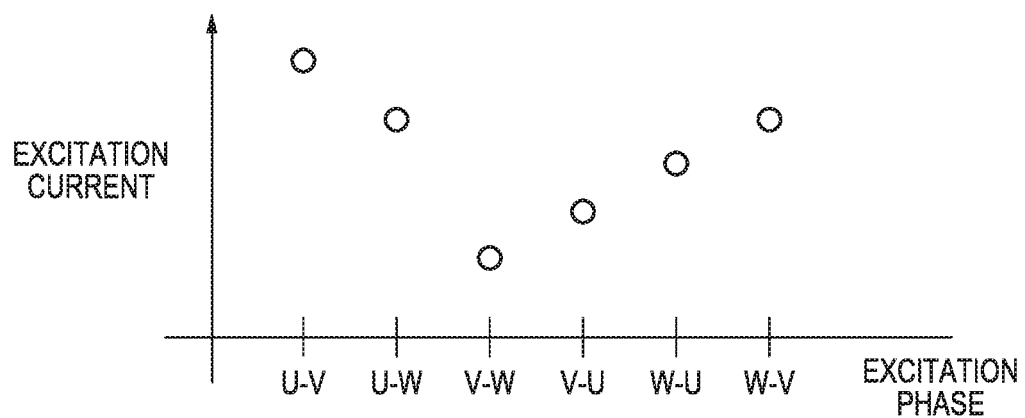
FIG. 5B is a diagram illustrating the relationship between an excitation phase and an excitation current according to an embodiment.

On the other hand, in the state indicated by reference numeral 501 in FIG. 4, the W-phase coil 75 opposes both an S pole and an N pole of the rotor 72. Thus, the influence of an external magnetic field of the rotor 72 is small, and the degree of reduction in the inductance of the coil 75 is smaller than that of the rotor 73. As described above, the value of the combined inductance when a certain excitation phase is excited differs according to the rotational position of the rotor 72. FIG. 5A shows an example of a combined inductance detected when each of the excitation phases is excited when the rotor 72 is stopped at the position at the U-V phase as indicated by reference numeral 501 in FIG. 4. The rotor 72 is stopped at the position at the U-V phase, and thus a combined inductance detected when the U-V phase is excited is smaller than combined inductances when other excitation phases are excited. In addition, FIG. 5B shows an example of the largest value of the excitation current when each of the excitation phases is excited for a predetermined period in a case where the rotor 72 is stopped at the position at the U-V phase. The smaller the combined inductance is, the larger the magnitude of the excitation current becomes, and thus the excitation current when the U-V phase is excited is larger than excitation currents when other excitation phases are excited. In this manner, relative magnitudes of combined inductances at the respective excitation phases can be determined based on the excitation currents when the excitation phases are excited, and accordingly the rotational position of the rotor 72 can be determined. In the following description, excitation for determining the rotational position of the rotor 72 is referred to as position determination excitation.

Figure 6:
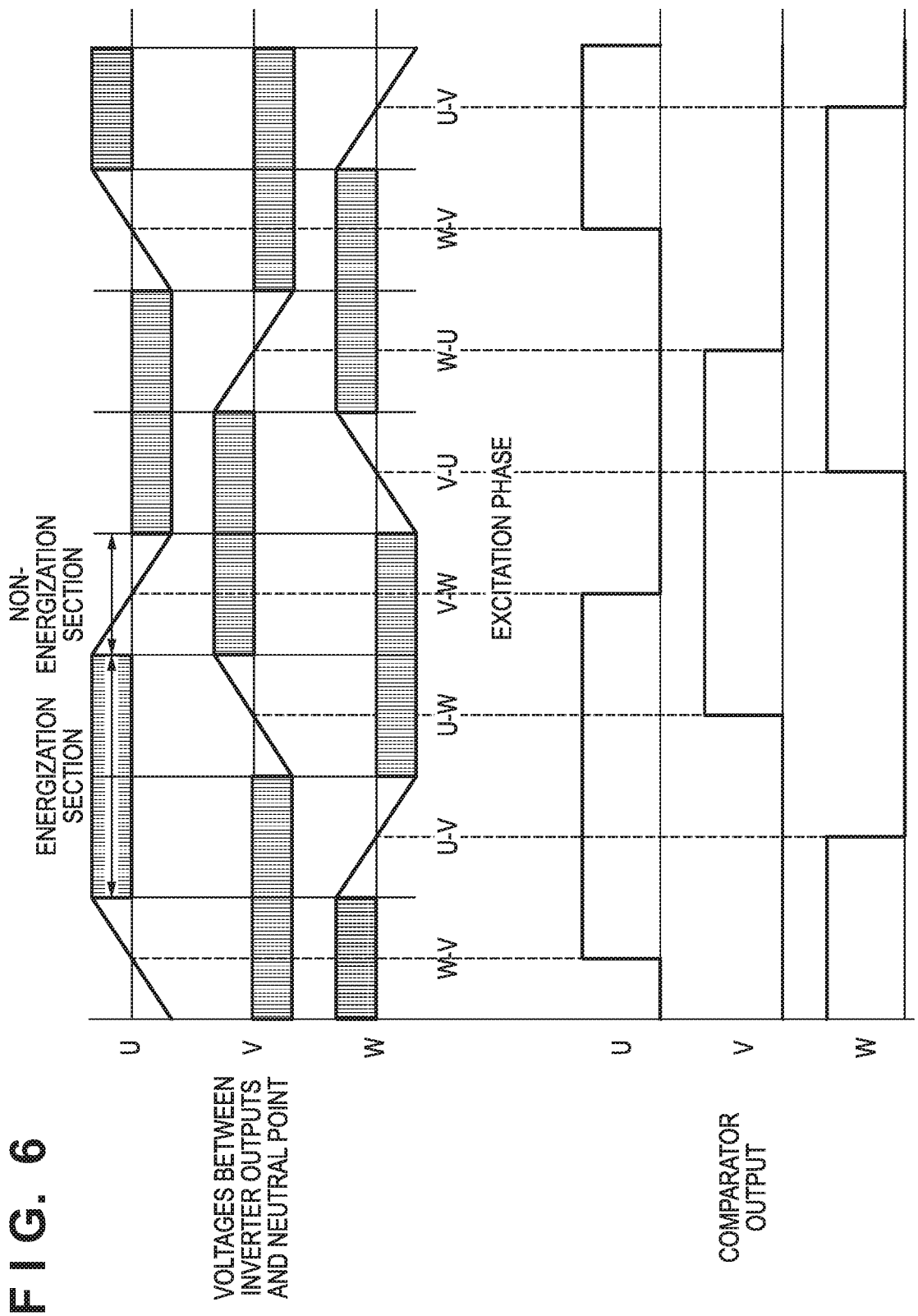
FIG. 6 is a diagram illustrating position detection of a rotor that is rotating at a high speed, according to an embodiment.

Next, detection of a rotational position of the rotor 72 when the motor 151 is rotating at a speed at which the coils 73 to 75 generate a sufficient voltage will be described with reference to FIG. 6. "Voltages between inverter outputs and neutral point" in FIG. 6 schematically indicates temporal change in voltages between two ends of the respective coils 73 to 75 when the rotor 72 is being rotated. In addition, "comparator output" indicates outputs of the comparator 64 in FIG. 3. The processing unit 51 can detect the rotational position of the rotor 72 based on rise and fall points of outputs of the comparator 64 shown in FIG. 6.

In order to rotate the rotor 72 when the rotor 72 is stopped, or when the rotation speed of the rotor 72 is not a rotation speed at which the coils 73 to 75 generate a sufficient inductive voltage, the processing unit 51 first determines a rotor stopping position. The processing unit 51 then performs excitation in the order shown in FIG. 4 using the determined rotor stopping position as a start point, and this is so-called forced commutation control. Forced commutation control is open-loop control. In this embodiment, when stopping rotation of the rotor 72, the processing unit 51 performs rotation control through forced commutation during a period from when the rotation speed of the rotor 72 decreases to a reference speed or lower until the rotation stops. The processing unit 51 then controls the motor 151 so as to stop the rotor 72 at a predetermined reference position. In the following description, this reference position is the position at the U-V phase, but the reference position may also be another position. In addition, in the following description, an excitation phase corresponding to the reference position is referred to as a reference excitation phase.

Figure 7A:
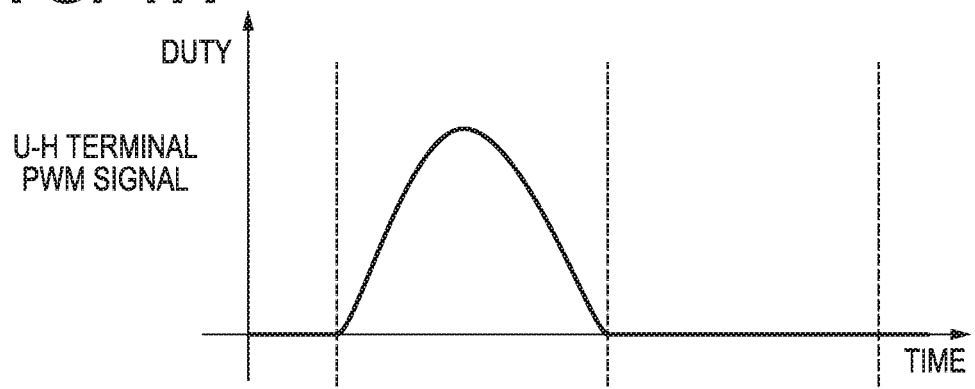
FIGS. 7A to 7C are diagrams illustrating an excitation method of excitation phases and an excitation current according to an embodiment.
Figure 7B:
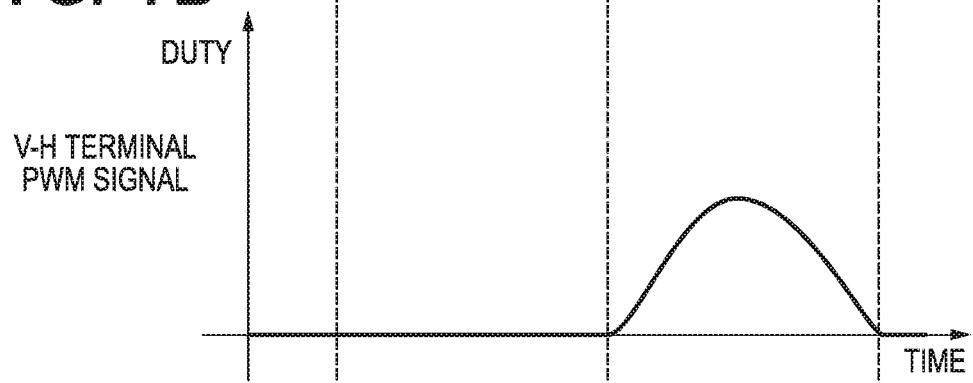
Figure 7C:
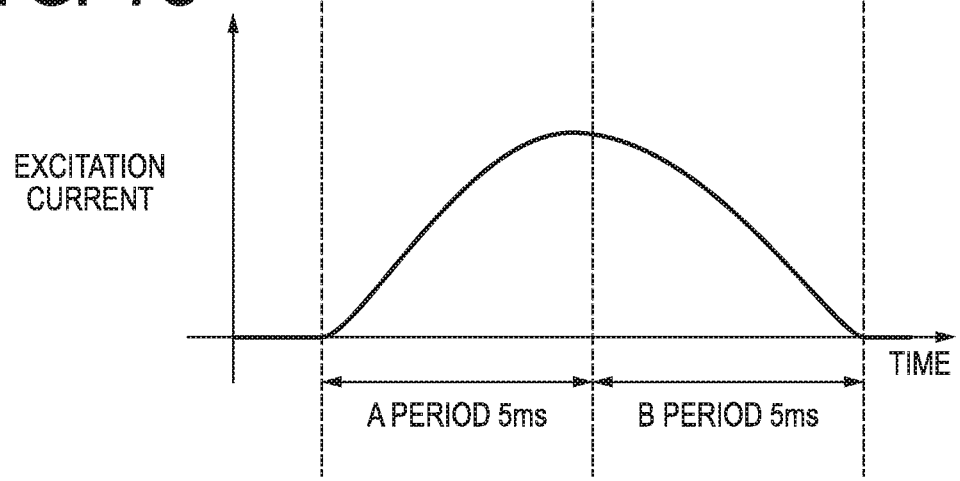

When rotating the rotor 72, the processing unit 51 performs position determination excitation on the reference excitation phase, which is the U-V phase in this example, in order to determine whether or not the stopping position of the rotor 72 is still the reference position, which is the position at the U-V phase in this example. When performing position determination excitation on the U-V phase, the processing unit 51 outputs a PWM signal whose duty changes as shown in FIG. 7A, from the U-H terminal of the PWM port 58 during the former half period (A period) of excitation. Specifically, during the A period, the duty of the PWM signal output from the U-H terminal is changed sinusoidally. Note that the half cycle of this sine wave corresponds to the A period, and the maximum value of the amplitude is 80%, for example. Note that, during the A period, the V-L terminal is kept at a high level (duty is 100%), and one end of the V-phase coil is connected to a node at a predetermined potential (GND). Note that the other terminals are kept at a low level (duty is 0%). In addition, a PWM signal whose duty changes as shown in FIG. 7B is output from the V-H terminal of the PWM port 58 during the latter half period (B period) of excitation. Specifically, during the B period, the duty of the PWM signal output from the V-H terminal is changed sinusoidally. The half cycle of this sine wave also corresponds to the length of the B period, and the maximum value of the amplitude is 50%, for example. Note that, during the B period, the U-L terminal is kept at a high level (duty is 100%), and one end of the U-phase coil is connected to a node at a predetermined potential (GND). Note that the other terminals are kept at a low level (duty is 0%). At this time, an excitation current that flows in the U-V phase is sinusoidal as shown in FIG. 7C. In addition, the durations of the A period and the B period in FIGS. 7A to 7C are determined, with the period during which the rotor 72 will not start rotating being the upper limit, and are set to be 5 ms in this example.

The processing unit 51 measures an excitation current that flows in the U-V phase for each predetermined period, for example, for each 25 µs, during the A period and the B period, and integrates measured excitation currents. This measurement value acquired by integrating excitation currents is hereinafter referred to as an excitation current integration value. In this embodiment, if the excitation current integration value when position determination excitation is performed on the U-V phase is larger than a predetermined first threshold, it is determined that the rotor 72 is stopped at the position at the U-V phase. On the other hand, if the excitation current integration value when position determination excitation is performed on the U-V phase is smaller than or equal to the first threshold, the processing unit 51 determines that the stopping position of the rotor 72 is not the position at the U-V phase. Note that, in this embodiment, an excitation current integration value is measured and detected as a physical amount that changes according to the magnitudes of the inductances of the coils 73 to 75. Here, the excitation current integration value is a value that increases as the inductance decreases. Therefore, in this embodiment, if the excitation current integration value when position determination excitation is performed on the U-V phase is larger than the predetermined first threshold, it is determined that the rotor 72 is stopped at the position at the U-V phase. However, when using a measurement value that decreases as the combined inductance decreases, if the measurement value when position determination excitation is performed on the U-V phase is smaller than the predetermined first threshold, it is determined that the rotor 72 is stopped at the position at the U-V phase.

In this embodiment, if it is determined that the stopping position of the rotor 72 is not the position at the U-V phase, the processing unit 51 excites other excitation phases in accordance with a predetermined order, measures the excitation current integration value, and compares the excitation current integration value with the first threshold. For example, the order shown in FIG. 8 can be adopted as this predetermined order. In the case where the order in FIG. 8 is adopted, if it is determined that the stopping position of the rotor 72 is not the position at the U-V phase, the processing unit 51 first performs position determination excitation on the U-W phase, and compares the excitation current integration value with the first threshold. If the excitation current integration value when position determination excitation is performed on the U-W phase is larger than the first threshold, the processing unit 51 determines that the rotor 72 is stopped at the position at the U-W phase. If it is determined that the rotor 72 is stopped at the position at the U-W phase, the processing unit 51 ends the position determination excitation that is in accordance with this predetermined order. On the other hand, if the excitation current integration value when position determination excitation is performed on the U-W phase is smaller than or equal to the first threshold as shown in FIG. 8, the processing unit 51 determines that the stopping position of the rotor 72 is not the position at the U-W phase. In this case, the processing unit 51 performs position determination excitation on the W-V phase in accordance with the order shown in FIG. 8, and compares the excitation current integration value with the first threshold. If the excitation current integration value when position determination excitation is performed on the W-V phase is larger than the first threshold as shown in FIG. 8, the processing unit 51 determines that the stopping position of the rotor 72 is the position at the W-V phase, and stops position determination excitation for subsequent excitation phases. Note that, if the excitation current integration value when position determination excitation is performed on the W-V phase is smaller than or equal to the first threshold, position determination excitation is performed sequentially in the excitation order shown in FIG. 8 until the excitation current integration value exceeds the first threshold.

Due to the above configuration, it is not required to always perform position determination excitation on all of the excitation phases every time before driving of the motor 151 is started, and the rotational position of the rotor 72 can be determined by performing position determination excitation on only a smaller number of excitation phases. Thus, it is possible to shorten a time required for determining the stopping position of the rotor 72 on the average.

Note that, as shown in FIG. 8, a configuration can be adopted in which the order for performing position determination excitation is an order in which a reference excitation phase is set as an excitation phase that is to be excited first, and after that, excitation is performed from an excitation phase with a smaller difference in electric angle from the reference excitation phase from among the six excitation phases. Specifically, the U-W phase and the W-V phase are excitation phases with the smallest difference in the electric angle from the U-V phase. Also, the V-W phase and the W-U phase are excitation phases with the second smallest difference in the electric angle from the U-V phase.

Furthermore, the V-U phase is an excitation phase with the largest difference in the electric angle from the U-V phase. In other words, from among positions at six excitation phases, position determination excitation is performed earlier on an excitation phase that causes the rotor 72 to stop at a position that forms a smaller angle with the reference position. In this embodiment, since the rotor 72 is stopped at the reference position, even if the rotor 72 moves due to vibration or the like thereafter, it is highly likely that the rotor 72 is stopped at a position close to the reference position. Therefore, by performing position determination excitation in above-described order, it is possible to find, at an early stage, an excitation phase whose excitation current integration value exceeds the first threshold, and it is possible to shorten a time required for determining the stopping position of the rotor 72 on the average.

Note that the order in which position determination excitation is performed is not limited to the order shown in FIG. 8, and may be another order such as an order same as the order in which excitation is performed when rotating the rotor 72, for example.

In addition, in this embodiment, an excitation current integration value that is an integrated value of excitation currents when excitation phases are excited only for a predetermined time is used as a physical amount that changes according to a change in the inductance. However, the measurement value of a physical amount that changes according to a change in the inductance is not limited to an excitation current integration value. For example, a peak value (maximum value) of an excitation current shown in FIG. 7C, an excitation current value after a predetermined period from when excitation was started, a time from when excitation was started until when the value of an excitation current reaches a predetermined value, and the like can be used as the measurement value. Note that, as described above, the magnitude relationship with a threshold and a determination result vary according to whether the measurement value increases or decreases as the inductance increases. In addition, in this embodiment, as shown in FIGS. 7A and 7B, the duties of PWM signals are changed sinusoidally, but can be changed in a triangular waveform or a trapezoidal waveform.

In addition, in this embodiment, six excitation phases are used as excitation phases of a three-phase (U, V, W) motor, but the present invention can be applied to a motor having any number of phases, and the number of coils included in each of the excitation phases is not limited to two.

In addition, in this embodiment, when stopping the rotor 72, the processing unit 51 performs control so as to stop the rotor 72 at the reference position. However, a configuration may also be adopted in which, after stopping the rotor 72, the processing unit 51 performs forced commutation control so as to move the rotor 72 to the reference position. In other words, it suffices for the rotor 72 to be moved to the reference position before rotation and driving of the rotor 72 is started.

Furthermore, a configuration may also be adopted in which, when stopping the rotor 72, control is not performed so as to stop the rotor 72 at the reference position. Also in this case, the processing unit 51 performs position determination excitation on excitation phases, for example, in the order shown in FIG. 8 using a reference excitation phase as a start point, until the excitation current integration value measured in position determination excitation exceeds the first threshold, for example. The processing unit 51 then determines that a rotational position corresponding to an excitation phase whose excitation current integration value exceeds the first threshold is the stopping position of the rotor 72. Also in such a configuration, it is not required to always perform position determination excitation on all of the excitation phases, and it is possible to shorten a time required for determining the stopping position of the rotor 72 on the average.

Second Embodiment

Next, a second embodiment will be described with a focus on differences from the first embodiment. In the first embodiment, the processing unit 51 performs position determination excitation on only one excitation phase, and determines whether or not the rotor 72 is at a position at the excitation phase. In this embodiment, first, the reference excitation phase is set as an determination target excitation phase, and position determination excitation is sequentially performed on two excitation phases, namely the determination target excitation phase and one of two excitation phases adjacent to the determination target excitation phase with respect to the electric angle. Specifically, in this example, the U-V phase is the reference excitation phase, and thus the U-V phase is set as an determination target excitation phase, and the processing unit 51 performs position determination excitation on the U-V phase and the U-W phase or the at the W-V phase. In the following description, the processing unit 51 performs position determination excitation on the U-V phase and the at the U-W phase. At this time, the processing unit 51 measures a first excitation current integration value when position determination excitation is performed on the U-V phase, and a second excitation current integration value when position determination excitation is performed on the U-W phase. Then, if the first excitation current integration value corresponding to the determination target excitation phase is larger than a predetermined first threshold, and the second excitation current integration value is smaller than or equal to the first threshold, the processing unit 51 determines that the rotor 72 is stopped at the position at the U-V phase that is the determination target excitation phase. Note that, if the measurement value is a value that increases as the inductance increase, if the measurement value when the U-V phase is excited is smaller than the first threshold, and the measurement value when the U-W phase is excited is larger than or equal to the first threshold, the processing unit 51 determines that the rotor 72 is stopped at the position at the U-V phase. If the above condition is not met, the processing unit 51 determines that the rotor 72 is not stopped at the position at the U-V phase, which is the determination target excitation phase. In this case, the processing unit 51 selects an determination target excitation phase in accordance with the excitation order shown in FIG. 8, for example, and repeatedly determines whether or not the rotor 72 is stopped at the position of the determination target excitation phase.

Note that a configuration can also be adopted in which the difference between two excitation current integration values when two adjacent excitation phases are excited is compared with a second threshold. For example, the processing unit 51 first obtains a first difference between a first excitation current integration value when position determination excitation is performed on the U-V phase that is an determination target excitation phase and a second excitation current integration value when position determination excitation is performed on the U-W phase. If the first excitation current integration value is larger than the second excitation current integration value, and the first difference is larger than the second threshold, the processing unit determines that the rotor 72 is stopped at the position at the U-V phase, which is an determination target excitation phase. If the above condition is not met, the processing unit 51 determines that the rotor 72 is not stopped at the position at the U-V phase, which is an determination target excitation phase. In this case, the processing unit 51 selects an determination target excitation phase, for example, in accordance with the excitation order shown in FIG. 8, and repeatedly determines whether or not the rotor 72 is stopped at the position at the determination target excitation phase.

According to the above configuration, it is not required to always perform position determination excitation on all of excitation phase every time before driving of the motor 151 is started, and the position of the rotor 72 can be determined by performing position determination excitation on only a smaller number of excitation phases. Thus, it is possible to shorten a time required for determining the stopping position of the rotor 72 on the average.

Third Embodiment

Next, a third embodiment will be described with a focus on differences from the first embodiment and the second embodiment. In the first embodiment, a configuration in which the rotor 72 is stopped at a reference position and a configuration in which the rotor 72 is not stopped at the reference position have been described. In this embodiment, the processing unit 51 stops the rotor 72 at a reference position. Specifically, the processing unit 51 performs control so as to stop the rotor 72 at a reference position when stopping the rotor 72, or performs control so as to move the rotor 72 to the reference position after stopping the rotor 72.

When stopping the rotor 72, the rotor 72 can rotate when intense vibration is applied to the image forming apparatus, for example, when the image forming apparatus is moved, but force is rarely applied to the rotor 72 from the outside when the image forming apparatus is used normally. Therefore, this embodiment is based on the presumption that the rotor 72 is basically stopped in the vicinity of the reference position. However, when rotating the rotor 72, a situation may occur in which the rotational position of the rotor 72 is between the position at the U-V phase and the position at the U-W phase, or between the position at the U-V phase and the position at the W-V phase.

FIG. 9A shows a state where the rotor 72 has moved to an intermediate position between the U-V phase and the U-W phase. FIG. 9B shows a state where position determination excitation is performed on the U-V phase in the state of FIG. 9A, and FIG. 9C shows a state where position determination excitation is performed on the U-W phase in the state of FIG. 9A. In FIGS. 9B and 9C, the U-phase coil 73 (N-pole) opposes only an S pole of the rotor 72. However, as shown in FIG. 9B, in position determination excitation on the U-V phase, the V-phase coil 74 opposes an S pole and N-pole of the rotor 72, and, as shown in FIG. 9C, in position determination excitation on the U-W phase, the W-phase 74 opposes an S pole and an N-pole of the rotor 72. Therefore, in the state of FIG. 9A, the excitation current integration value when position determination excitation is performed on the U-V phase is smaller compared with a case where the rotor 72 is stopped at the position at the U-V phase. Note that, when the rotor 72 is stopped at the position as in FIG. 9A, the excitation current integration value that is obtained by performing position determination excitation on the U-V phase, and the excitation current integration value that is obtained by performing position determination excitation on the U-W phase are about the same, and are larger than the excitation current integration values when other excitation phases are excited.

Therefore, in this embodiment, the processing unit 51 first sets the reference excitation phase as an determination target excitation phase, and performs position determination excitation on the determination target excitation phase and two excitation phases adjacent to the determination target excitation phase. Specifically, in this example, the U-V phase is the reference excitation phase, and thus the processing unit 51 performs position determination excitation on the U-V phase, the U-W phase, and the W-V phase. The processing unit 51 then measures the first excitation current integration value of the U-V phase that is the determination target excitation phase, the second excitation current integration value of the U-W phase, and a third excitation current integration value of the W-V phase. Subsequently, the processing unit 51 obtains a first difference between the first excitation current integration value and the second excitation current integration value and a second difference between the first excitation current integration value and the third excitation current integration value. If the first excitation current integration value is larger than the second excitation current integration value and the third excitation current integration value, and both the first difference and the second difference are larger than a third threshold, the processing unit 51 determines that the rotor 72 is stopped at the position at the U-V phase that is the determination target excitation phase.

In addition, if the first excitation current integration value is larger than the third excitation current integration value, and the second difference is larger than the third threshold; but the first difference is smaller than or equal to the third threshold, the processing unit 51 determines that the rotor 72 is stopped at a position between the U-V phase and the U-W phase. On the other hand, if the first excitation current integration value is larger than the second excitation current integration value, and the first difference is larger than the third threshold; but the second difference is smaller than the third threshold, the processing unit 51 determine that the rotor 72 is stopped at a position between the U-V phase and the W-V phase. Note that, if none of the above applies, the processing unit 51 selects an determination target excitation phase in accordance with the excitation order shown in FIG. 8, and repeats the processing until the rotational position of the rotor 72 can be determined.

Due to the above configuration, it is not required to always perform position determination excitation on all of the excitation phases every time before driving of the motor 151 is started, and the rotational position of the rotor 72 can be determined by performing position determination excitation on only a smaller number of excitation phases. Thus, it is possible to shorten a time required for determining the stopping position of the rotor 72.

Other Embodiments

Note that, in the above embodiments, the motor control unit 41, which is a constituent element of the image forming apparatus 10, is referred to as such, but the motor control unit 41 can also be an apparatus, and be referred to as a motor control apparatus. In addition, an apparatus that includes the control unit 40 and the motor control unit 41 can be a motor control apparatus. In addition, in the above embodiments, the motor 151 causes a rotating member related to image formation of the image forming apparatus 10 such as the photosensitive member 11 to rotate, but the present invention can also be applied to a motor for conveying the recording member P. In addition, the configuration of the motor 151 is not limited to the configuration shown in FIG. 4, and a motor with another pole number or another number of phases may also be adopted.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-008599, filed on Jan. 22, 2019, which is hereby incorporated by reference wherein in its entirety.

What is claimed is:

1. A motor control apparatus comprising:
   an excitation unit configured to excite a plurality of excitation phases of a motor;
   a measurement unit configured to measure a physical amount that changes according to an inductance of at least one of a plurality of coils that make up the plurality of excitation phases, when each of the plurality of excitation phases is excited; and
   a control unit configured to control the excitation unit, wherein the control unit is configured to excite, in a period to determine a stop position of a rotor of the motor, the plurality of excitation phases sequentially, and to determine the stop position of the rotor of the motor by comparing a measurement value measured by the measurement unit in excitation of each of the plurality of excitation phases with a first threshold sequentially, and when the stop position of the rotor of the motor is determined, the control unit is further configured not to excite a remaining exciting phase of the plurality of exciting phases.

2. The motor control apparatus according to claim 1, wherein the control unit excites the plurality of excitation phases sequentially in a predetermined order.

3. The motor control apparatus according to claim 2,
wherein, when stopping rotation of the rotor, the control unit controls the excitation unit so as to stop the rotor at a reference position at which the rotor stops when a reference excitation phase that comes first in the order is excited.

4. The motor control apparatus according to claim 2,
wherein, after stopping rotation of the rotor, the control unit controls the excitation unit so as to move the rotor to a reference position at which the rotor stops when a reference excitation that comes first in the order is excited.

5. The motor control apparatus according to claim 3,
wherein the order is an order in which an excitation phase with a smaller difference from the reference excitation phase with respect to an electric angle is excited earlier from among the plurality of excitation phases.

6. The motor control apparatus according to claim 1,
wherein, if the measurement value is a value that increases as the inductance decreases, a first excitation phase corresponding to the stop position of the rotor of the motor is an excitation phase for which the measurement value when being excited by the excitation unit is larger than the first threshold, and
if the measurement value is a value that decreases as the inductance decreases, the first excitation phase is an excitation phase for which the measurement value when being excited by the excitation unit is smaller than the first threshold.

7. A motor control apparatus comprising:
an excitation unit configured to excite a plurality of excitation phases of a motor;
a measurement unit configured to measure a physical amount that changes according to an inductance of at least one of a plurality of coils that make up the plurality of excitation phases, when each of the plurality of excitation phases is excited; and
a control unit configured to control the excitation unit so as to stop a rotor of the motor at a first rotational position,
wherein the first rotational position is a rotational position at which the rotor stops when a first excitation phase from among the plurality of excitation phases is excited, and
the control unit determines whether or not the rotor is stopped at the first rotational position by comparing a first measurement value measured by the measurement unit when the first excitation phase is excited with a first threshold.

8. The motor control apparatus according to claim 7,
wherein, if a measurement value measured by the measurement unit is a value that increases as the inductance decreases, the control unit determines that the rotor is stopped at the first rotational position if the first measurement value is larger than the first threshold, and
if the measurement value is a value that decreases as the inductance decreases, the control unit determines that the rotor is stopped at the first rotational position if the first measurement value is smaller than the first threshold.

9. The motor control apparatus according to claim 7,
wherein the control unit further compares, with the first threshold, a second measurement value measured by the measurement unit when a second excitation phase adjacent to the first excitation phase with respect to an electric angle from among the plurality of excitation phases is excited, in order to determine whether or not the rotor is stopped at the first rotational position.

10. The motor control apparatus according to claim 9,
wherein, if a measurement value measured by the measurement unit is a value that increases as the inductance decreases, the control unit determines that the rotor is stopped at the first rotational position if the first measurement value is larger than the first threshold, and the second measurement value is smaller than or equal to the first threshold, and
if the measurement value is a value that decreases as the inductance decreases, the control unit determines that the rotor is stopped at the first rotational position if the first measurement value is smaller than the first threshold, and the second measurement value is larger than or equal to the first threshold.

11. A motor control apparatus comprising:
an excitation unit configured to excite a plurality of excitation phases of a motor;
a measurement unit configured to measure a physical amount that changes according to an inductance of at least one of a plurality of coils that make up the plurality of excitation phases, when each of the plurality of excitation phases is excited; and
a control unit configured to control the excitation unit so as to stop a rotor of the motor at a first rotational position,
wherein the first rotational position is a rotational position at which the rotor stops when a first excitation phase from among the plurality of excitation phases is excited, and
the control unit determines whether or not the rotor is stopped at the first rotational position, based on a first measurement value measured by the measurement unit when the first excitation phase is excited, a second measurement value measured by the measurement unit when a second excitation phase adjacent to the first excitation phase with respect to an electrical angle from among the plurality of excitation phases is excited, and a second threshold.

12. The motor control apparatus according to claim 11,
wherein, if the first measurement value is larger than the second measurement value, and a difference between the first measurement value and the second measurement value is larger than the second threshold, the control unit determines that the rotor is stopped the first rotational position.

13. A motor control apparatus comprising:
an excitation unit configured to excite a plurality of excitation phases of a motor;
a measurement unit configured to measure a physical amount that changes according to an inductance of at least one of a plurality of coils that make up the plurality of excitation phases, when each of the plurality of excitation phases is excited; and
a control unit configured to control the excitation unit so as to stop a rotor of the motor at a first rotational position,
wherein the first rotational position is a rotational position at which the rotor stops when a first excitation phase from among the plurality of excitation phases is excited, and
the control unit determines whether or not the rotor is stopped at the first rotational position, based on a first measurement value measured by the measurement unit when the first excitation phase is excited, a second measurement value and a third measurement value measured by the measurement unit when a second excitation phase and a third excitation phase adjacent to the first excitation phase with respect to an electrical angle from among the plurality of excitation phases are excited, and a third threshold.

14. The motor control apparatus according to claim 13, wherein, if the first measurement value is larger than the second measurement value and the third measurement value, and both a first difference between the first measurement value and the second measurement value and a second difference between the first measurement value and the third measurement value are larger than the third threshold, the control unit determines that the rotor is stopped at the first rotational position.

15. The motor control apparatus according to claim 14, wherein, if the first measurement value is larger than the third measurement value, the second difference is larger than the third threshold, and the first difference is smaller than or equal to the third threshold, the control unit determines that the rotor is stopped between the first rotational position and a second rotational position at which the rotor stops when the second excitation phase is excited, and, if the first measurement value is larger than the second measurement value, the first difference is larger than the third threshold, and the second difference is smaller than or equal to the third threshold, determines that the rotor is stopped between the first rotational position and a third rotational position at which the rotor stops when the third excitation phase is excited.

16. The motor control apparatus according to claim 1, wherein a measurement value measured by the measurement unit is a value that is based on an excitation current when each of the plurality of excitation phases is excited.

17. The motor control apparatus according to claim 16, wherein the measurement value is a largest value or an integrated value of excitation currents when each of the plurality of excitation phases is excited only for a predetermined time.

* * * * *

UNITED STATES PATENT AND TRADEMARK OFFICE
CERTIFICATE OF CORRECTION

| | |
|---|---|
| PATENT NO. | : 11,329,580 B2 |
| APPLICATION NO. | : 16/748118 |
| DATED | : May 10, 2022 |
| INVENTOR(S) | : Yasukazu Maeda, Eijiro Ohashi and Takuya Miyashita |

It is certified that error appears in the above-identified patent and that said Letters Patent is hereby corrected as shown below:

On the Title Page

Item (73) should read:
(73) Assignee: Canon Kabushiki Kaisha, Tokyo (JP)

Signed and Sealed this
Eighteenth Day of October, 2022

Katherine Kelly Vidal
*Director of the United States Patent and Trademark Office*